US006225624B1

(12) United States Patent
Littlejohn et al.

(10) Patent No.: US 6,225,624 B1
(45) Date of Patent: May 1, 2001

(54) PRECISION PRESSURE MONITOR

(75) Inventors: Duane P. Littlejohn, Manlius; Robert W. Arnold, Johnson City, both of NY (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/173,910

(22) Filed: Oct. 16, 1998

(51) Int. Cl.[7] .......... B01D 59/44; H01J 49/00; H01J 49/40

(52) U.S. Cl. .......... 250/291; 250/282; 250/286

(58) Field of Search .......... 250/282, 286, 250/291

(56) References Cited

U.S. PATENT DOCUMENTS

| | | | | |
|---|---|---|---|---|
| 3,937,955 | * | 2/1976 | Comisarrow et al. | 250/291 |
| 4,686,365 | * | 8/1987 | Meek et al. | 250/291 |
| 4,761,545 | * | 8/1988 | Marshall et al. | 250/291 |
| 4,931,640 | * | 6/1990 | Marshall et al. | 250/291 |
| 4,933,547 | * | 6/1990 | Cody | 250/282 |
| 5,155,357 | * | 10/1992 | Hemond | 250/291 |
| 5,313,061 | | 5/1994 | Drew et al. | 250/281 |
| 5,477,046 | * | 12/1995 | Dietrich et al. | 250/288 |

* cited by examiner

*Primary Examiner*—Bruce C. Anderson
(74) *Attorney, Agent, or Firm*—I. Marc Asperas

(57) ABSTRACT

During operation of a FTICR MS the time after the opening of the pulsed valve sample gas inlet system that the peak of sample gas pressure occurs in the vacuum chamber is determined by measuring the amplitude of the ion pump current. The FTICR MS then uses that time and the known period of time for which a source of electrons used for an ionization event is energized to energize the electron source so that the known period of time includes the peak of vacuum chamber sample gas pressure. This allows ions to be created during the peak of the sample gas pressure to thereby obtain the maximum sensitivity during measurements.

3 Claims, 2 Drawing Sheets

PRECISION PRESSURE MONITOR

1. Field of the Invention

This invention relates to a mass spectrometer (MS) which uses the Fourier transform ion cyclotron resonance (FTICR) technique to determine the mass of ions and more particularly to the determination during operation of the FTICR MS of the time after the opening of the pulsed valve gas inlet system that the peak in sample gas pressure occurs so that during measurements an ionization event can be initiated at a time that will maximize the number of ions that are produced and thus obtain maximum sensitivity.

2. Description of the Prior Art

When a gas phase ion at low pressure is subjected to a uniform static magnetic field, the resulting behavior of the ion is determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the absence of any other forces on the ion, the angular frequency of this motion is a simple function of the ion charge, the ion mass, and the magnetic field strength:

$$\omega = qB/m \qquad \text{Eq. 1}$$

where:

ω=angular frequency (radians/second)

q=ion charge (coulombs)

B magnetic field strength (tesla)

m=ion mass (kilograms)

The FTICR MS exploits the fundamental relationship described in Equation 1 to determine the mass of ions by inducing large amplitude cyclotron motion and then determining the frequency of the motion. The first use of the Fourier transform in an ion cyclotron resonance mass spectrometer is described in U.S. Pat. No. 3,937,955 entitled "Fourier Transform Ion Cyclotron Resonance Spectroscopy Method And Apparatus" issued to M. B. Comisarow and A. G. Marshall on Feb. 10, 1976.

The ions to be analyzed are first introduced to the magnetic field with minimal perpendicular (radial) velocity and dispersion. The cyclotron motion induced by the magnetic field effects radial confinement of the ions; however, ion movement parallel to the axis of the field must be constrained by a pair of "trapping" electrodes. These electrodes typically consist of a pair of parallel-plates oriented perpendicular to the magnetic axis and disposed on opposite ends of the axial dimension of initial ion population. These trapping electrodes are maintained at a potential that is of the same sign as the charge of the ions and of sufficient magnitude to effect axial confinement of the ions between the electrode pair.

The trapped ions are then exposed to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one mass are to be analyzed, the frequency of the oscillating field may be swept over an appropriate range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

An important feature of this resonant acceleration is that the initial radial dispersion of the ions is essentially unchanged. The excited ions will remain grouped together on the circumference of the new cyclotron orbit, and to the extent that the dispersion is small relative to the new cyclotron radius, their motion will be mutually in phase or coherent. If the initial ion population consisted of ions of more than one mass, the acceleration process will result in a multiple isomass ion bundles, each orbiting at its respective cyclotron frequency.

The acceleration is continued until the radius of the cyclotron orbit brings the ions near enough to one or more detection electrodes to result in a detectable image charge being induced on the electrodes. Typically these "detect" electrodes will consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection are mutually perpendicular and together form a closed box-like structure referred to as a trapped ion cell. FIG. 1 shows a simplified diagram for a trapped ion cell 12 having trap electrodes 12*a* and 12*b;* excite electrodes 12*c* and 12*d;* and detect electrodes 12*e* and 12*f.*

As the coherent cyclotron motion within the cell causes each isomass bundle of ions to alternately approach and recede from a detection electrode 12*e,* 12*f,* the image charge on the detection electrode correspondingly increases and decreases. If the detection electrodes 12*e,* 12*f* are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current is amplified and digitized, and the frequency data is extracted by means of the Fourier transform. Finally, the resulting frequency spectrum is converted to a mass spectrum using the relationship in Equation 1.

Referring now to FIG. 2, there is shown a general implementation of a FTICR MS 10. The FTICR MS 10 consists of seven major subsystems necessary to perform the analytical sequence described above. The trapped ion cell 12 is contained within a vacuum system 14 comprised of a chamber 14*a* evacuated by an appropriate pumping device 14*b*. The chamber is situated within a magnet structure 16 that imposes a homogeneous static magnetic field over the dimension of the trapped ion cell 12. While magnet structure 16 is shown in FIG. 2 as a permanent magnet, a superconducting magnet may also be used to provide the magnetic field.

Pumping device 14*b* may be an ion pump which is an integral part of the vacuum chamber 14*a.* Such an ion pump then uses the same magnetic field from magnet structure 16 as is used by the trapped ion cell 12. An advantage of using an integral ion pump for pumping device 14*b* is that the integral ion pump eliminates the need for vacuum flanges that add significantly to the volume of gas that must be pumped and to the weight and cost of the FTICR MS. One example of a mass spectrometer having an integral ion pump is described in U.S. Pat. No. 5,313,061.

The sample to be analyzed is admitted to the vacuum chamber 14*a* by a sample introduction system 18 that may, for example, consist of a leak valve or gas chromatograph column. The sample molecules are converted to charged species within the trapped ion cell 12 by means of an ionizer 20 which typically consists of a gated electron beam passing through the cell 12, but may consist of a photon source or other means of ionization. Alternatively, the sample molecules may be created external to the vacuum chamber 14*a* by any one of many different techniques, and then injected along the magnetic field axis into the chamber 14*a* and trapped ion cell 12.

The various electronic circuits necessary to effect the trapped ion cell events described above are contained within an electronics package 22 which is controlled by a computer based data system 24. This data system 24 is also employed to perform reduction, manipulation, display, and communication of the acquired signal data.

The FTICR MS performs a pulsed analysis. This is in contrast to most other mass spectrometers where sample is continuously admitted and measured. In the FTICR MS sample is required for only a few milliseconds and in this system is supplied by a computer controlled pulsed sample valve. An electron-ionizing beam is turned on for tens of milliseconds to form and trap ions from the sample molecules. In order to achieve the most sensitive measurement in the FTICR MS it is necessary that the electron beam ionization of the sample gas take place at the peak pressure of the sample gas in the vacuum chamber. Therefore, during operation of the FTICR MS a determination should be made when that peak pressure has occurred. Standard vacuum pressure gages cannot be used to make that determination as they are not fast enough to follow the time course of the increase and decrease of the sample gas pressure and would significantly increase the volume to be pumped. The present invention is able to make that determination by monitoring the ion pump current.

SUMMARY OF THE INVENTION

The present invention is a method for determining in a mass spectrometer having a sample gas introducing system, an ionization chamber, an ion pump and a supply for providing electrical power to said ion pump the time of occurrence of the peak pressure of a gas sample admitted to the ionization chamber. The ion pump current is a sensitive function of the pressure in the ionization chamber. The method includes the step of opening the sample gas introducing system. The method further includes the step of taking samples of the current to said ion pump. The method also includes the step of obtaining from the power supply a signal representative of the amplitude of the current flowing in the ion pump. The method further also includes the step of determining from the samples and the signal representative of ion pump current amplitude the time when the peak of the ion pump current has occurred.

DESCRIPTION OF THE PREFERRED EMBODIMENT(S)

Figure 1:
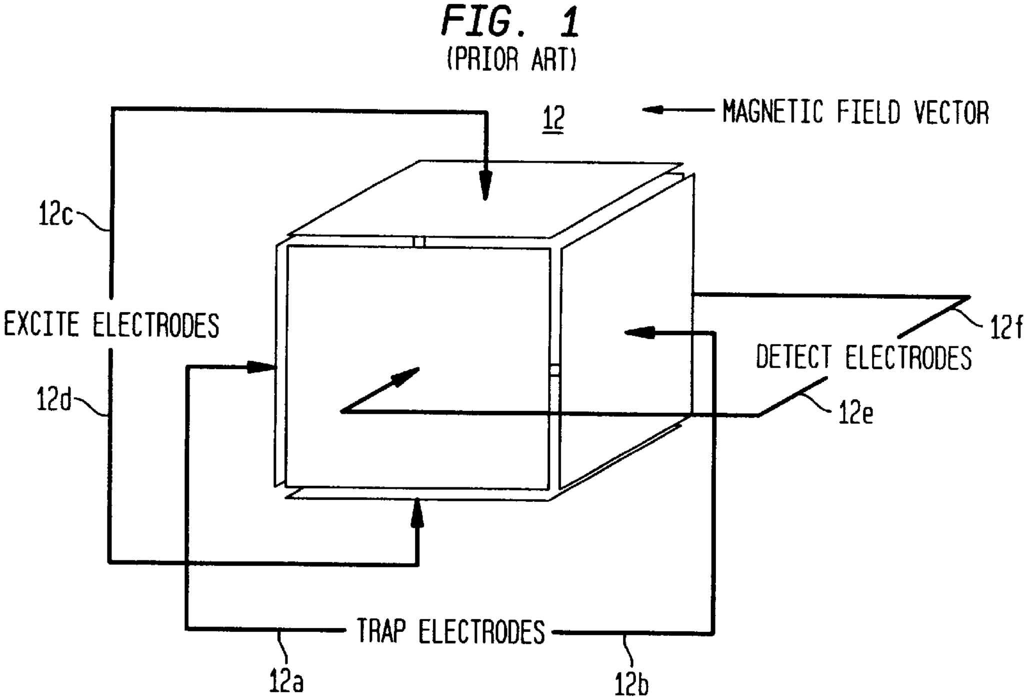
FIG. 1 (PRIOR ART)
FIG. 1 shows a simplified diagram for a trapped ion cell.
Figure 2:
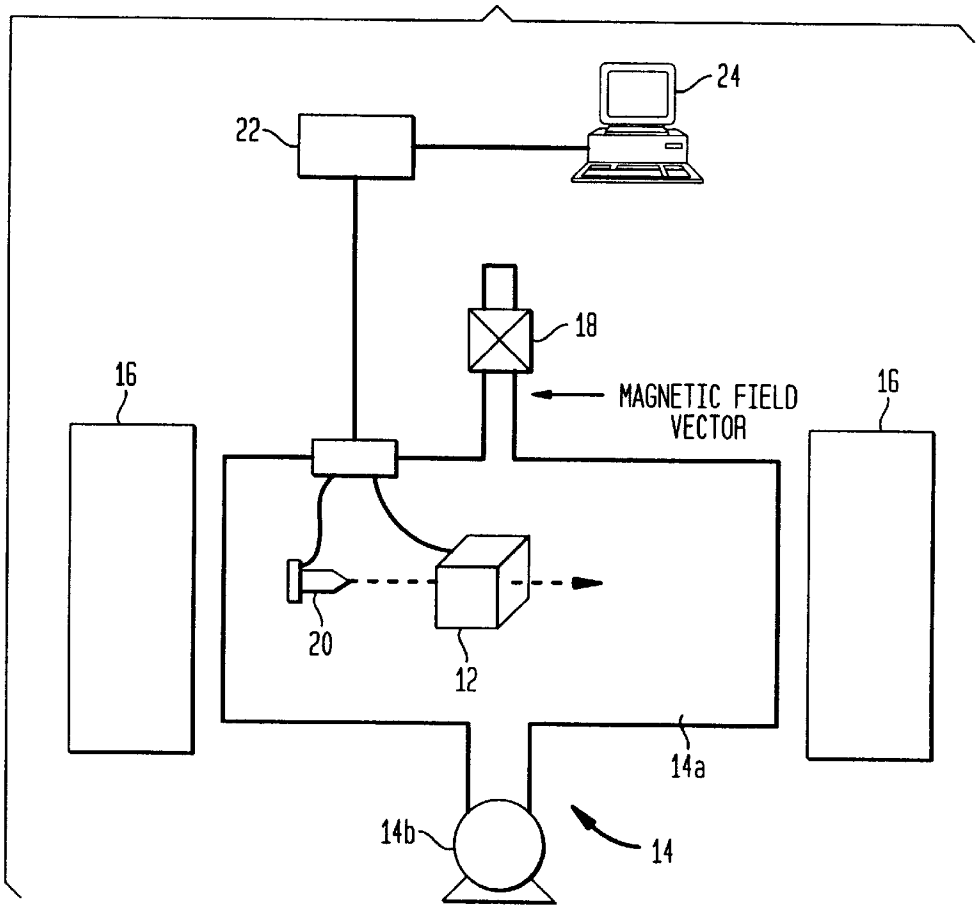
FIG. 2 (PRIOR ART)
FIG. 2 shows a block diagram of a typical FTICR MS.
Figure 3:
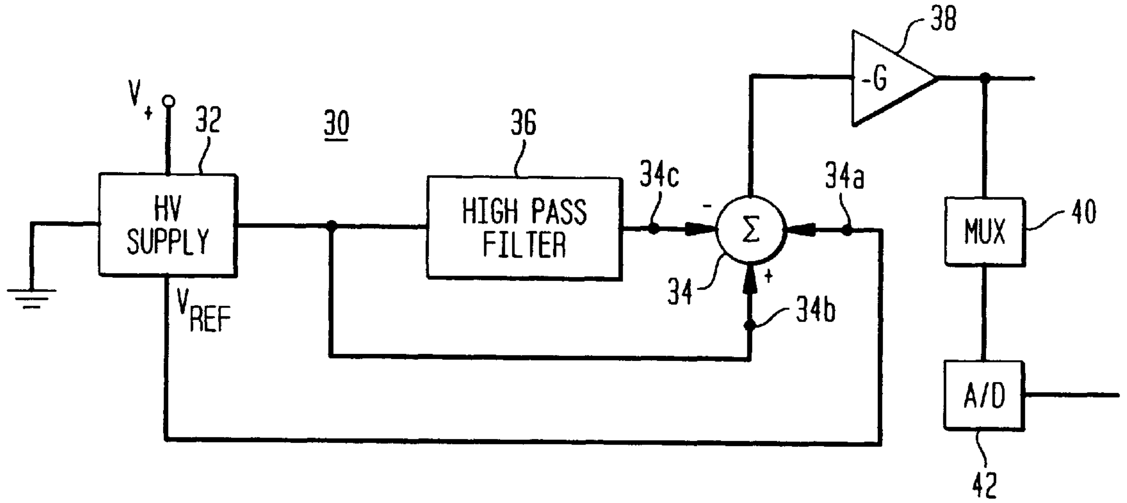
FIG. 3 shows the circuit which is used during operation of the FTICR MS to determine the time of occurrence after the opening of the sample introduction system of the pressure peak of the sample gas entering the vacuum chamber.

Referring now to FIG. 3, there is shown the circuit 30 which is used during operation of the FTICR MS 10 to determine the time of occurrence after the opening of the sample introduction system 18 of the pressure peak of the sample gas entering into vacuum chamber 14. Circuit 30 includes a high voltage supply 32 which supplies a voltage Vref to an input 34*a* of a summer circuit (summer) 34. Supply 32 provides the high voltage to the ion pump 14*b*. Circuit 30 also includes a signal, Isense, from supply 32 in the form of a voltage representative of the current in ion pump 14*b*. That voltage is connected to the input of a high pass filter 36 and to an input 34*b* of summer 34. The ion pump current is a very sensitive function of the pressure in the vacuum chamber 14.

Figure 4A:
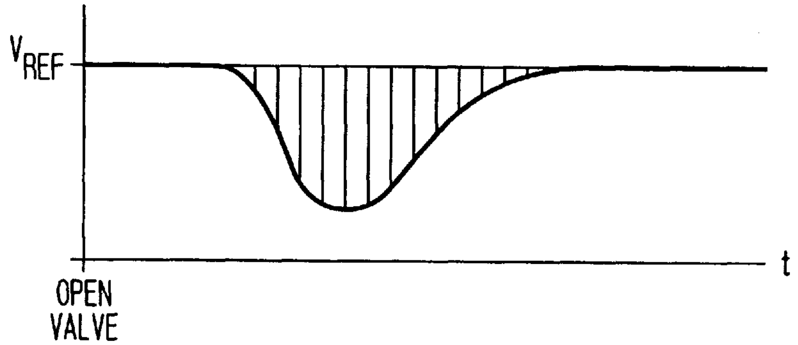
FIG. 4*a* shows the waveform of the voltage representative of the samples of the ion pump current.
Figure 4B:
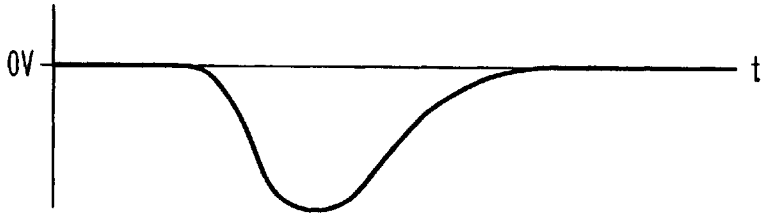
FIG. 4*b* shows waveform of the voltage at the output of the summer of FIG. 3.

As sample gas is admitted to chamber 14, the pressure in the chamber increases as does the current in the ion pump 14*b*. The increase in ion pump current causes the amplitude of the voltage at the input of high pass filter 36 and at input 34*b* of summer 34 to decrease. The voltage representative of the samples of the ion pump current has the waveform shown in FIG. 4*a*. That waveform has a low frequency envelope and high frequency spikes. The high pass filter 36 filters out the envelope and passes the high frequency spikes. The voltage at the output of the high pass filter 36 is connected to input 34*c* of summer 34 so that it subtracts from the voltage at input 34*b*. As was described above, the voltage Vref is connected to input 34*a* of summer 34. Therefore, the waveform of the voltage at the output 34*d* of the summer 34 is as is shown in FIG. 4*b*. That voltage is then passed through an amplifier 38 that has a negative gain.

When the signal is sent to open sample introduction system 18, a multiplexer 40 (MUX) with a digital sampling rate of 100 kHz is used to sample the voltage output of amplifier 38. The samples, occurring at every 10 μsec, occur at a rate, which is fast as compared to the frequency of the envelope of the waveform shown in FIG. 4*a*. The FTICR MS 10 can then very accurately to a precision of 10usec, determine from the signal at the output of amplifier 38 the time at which the peak ion pump current has occurred as measured from the time of the opening of system 18. Since the ion pump current is a very sensitive function of the pressure in the vacuum chamber 14, the determination of the time of occurrence of the peak ion pump current is also the determination of the time that the sample gas pressure in chamber 14 reaches a peak.

Using electron impact ionization, an ionization event in FTICR MS 10 occurs when electrons are directed through the analyzer cell for the period of time during which it is desired to bombard the gas phase species of interest with the electrons to thereby produce ions. Since the time of occurrence of the peak of the transient gas pressure in the vacuum chamber 14 from the opening of sample introduction system 18 has been determined in the manner described above, and the period of time for which the electron beam is directed through the analyzer cell is also known the times at which the electron source begins and ends can then be set so that during measurements the electron source is energized so that the known period of time includes the peak of the sample gas pressure in chamber 14.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for determining in a mass spectrometer having a sample gas introducing system, an ionization chamber, an ion pump and a supply for providing electrical power to said ion pump the time of occurrence of the peak pressure of a gas sample admitted to said ionization chamber, said method comprising the steps of:

a. opening said sample gas introducing system;

b. taking samples of the current to said ion pump;

c. obtaining from said power supply a signal representative of the amplitude of the current flowing in said ion pump; and d. determining from said samples and said signal representative of ion pump current amplitude the time when the peak of said ion pump current has occurred.

2. The method of claim 1 wherein said mass spectrometer has an electron source further comprising the step of adjusting the time said electron source is energized so that said source is energized during a period of time which includes said time of occurrence of said peak ion pump current.

3. The method of claim 1 wherein said ion pump is integral with said ionization chamber.

* * * * *